US010832182B2

(12) United States Patent
Floyd et al.

(10) Patent No.: US 10,832,182 B2
(45) Date of Patent: Nov. 10, 2020

(54) METHOD AND SYSTEM FOR MANAGING A PROGRAM RELATING TO A PRODUCT

(75) Inventors: Joseph F Floyd, University Place, WA (US); Brent Louis Hadley, Kent, WA (US); Patrick Jan Eames, Newcastle, WA (US); Paul A Sesny, Renton, WA (US); Quentin S Patterson, Kent, WA (US); Stephen Paul Miller, Bellevue, WA (US); Brian Lee Coker, Seattle, WA (US); Chul Y Park, Snohomish, WA (US); Michael W Boyd, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 869 days.

(21) Appl. No.: 12/577,710

(22) Filed: Oct. 12, 2009

(65) Prior Publication Data

US 2011/0087513 A1    Apr. 14, 2011

(51) Int. Cl.
*G06Q 10/06*    (2012.01)

(52) U.S. Cl.
CPC ....... *G06Q 10/06* (2013.01); *G06Q 10/06313* (2013.01)

(58) Field of Classification Search
USPC .................................................. 707/1, 601
See application file for complete search history.

(56) References Cited

U.S. PATENT DOCUMENTS

| | | | |
|---|---|---|---|
| 4,928,233 A | 5/1990 | Millis | |
| 5,742,331 A | 4/1998 | Uomori et al. | |
| 5,966,132 A | 10/1999 | Kakizawa et al. | |
| 6,241,610 B1 | 6/2001 | Miyamoto et al. | |
| 6,944,584 B1 * | 9/2005 | Tenney et al. | 703/22 |
| 7,069,261 B2 | 6/2006 | Ahl et al. | |
| 7,440,906 B1 | 10/2008 | Wetzer et al. | |
| 7,506,547 B2 | 3/2009 | Jesmonth | |
| 8,683,367 B1 | 3/2014 | Hadley et al. | |
| 8,843,350 B2 | 9/2014 | Jacobi et al. | |
| 2002/0059320 A1 * | 5/2002 | Tamaru | E02F 9/26 |
| 2002/0120921 A1 * | 8/2002 | Coburn et al. | 717/140 |

(Continued)

OTHER PUBLICATIONS

Douglas, Maintenance Performance Toolbox, Aeromagazine Quarterly, Qtr_01, 2007, p. 22-27.*

(Continued)

*Primary Examiner* — Amber A Misiaszek
(74) *Attorney, Agent, or Firm* — Armstrong Teasdale LLP

(57) ABSTRACT

A method for managing a program relating to a product, the program including a plurality of program requirements for performing a plurality of program tasks, includes: (a) establishing a location reference system for a representation of the product in three dimensions; (b) identifying a plurality of task-loci in a display; the display presenting the representation of the product according to the location reference system; each respective task-locus of the plurality of task-loci being associated with a respective program task of the plurality of program tasks; (c) characterizing each respective task-locus associated with an accomplished respective program task as a respective completed task-locus; and (d) accounting for accomplishment of the respective program tasks by accounting for the respective completed task-loci.

20 Claims, 5 Drawing Sheets

(56) References Cited

U.S. PATENT DOCUMENTS

| | | | |
|---|---|---|---|
| 2002/0133252 A1* | 9/2002 | Landers et al. | 700/97 |
| 2003/0004600 A1 | 1/2003 | Priedeman et al. | |
| 2003/0182083 A1* | 9/2003 | Schwenke et al. | 702/183 |
| 2003/0187823 A1* | 10/2003 | Ahl | G06F 16/748 |
| 2004/0117081 A1* | 6/2004 | Mori | G01S 5/02 |
| | | | 701/1 |
| 2004/0128120 A1* | 7/2004 | Coburn et al. | 703/26 |
| 2004/0254764 A1* | 12/2004 | Wetzer | G05B 23/0283 |
| | | | 702/184 |
| 2006/0268018 A1* | 11/2006 | Christman et al. | 345/660 |
| 2006/0287084 A1 | 12/2006 | Mao et al. | |
| 2007/0070066 A1 | 3/2007 | Bakhash et al. | |
| 2007/0112488 A1* | 5/2007 | Avery | G06Q 10/06 |
| | | | 701/29.3 |
| 2007/0241908 A1* | 10/2007 | Coop | G06Q 10/06 |
| | | | 340/572.8 |
| 2007/0294278 A1* | 12/2007 | Vandermolen | G06Q 10/06 |
| 2009/0138139 A1* | 5/2009 | Tsai | G06Q 10/06 |
| | | | 701/3 |
| 2010/0211358 A1 | 8/2010 | Kesler et al. | |
| 2011/0087513 A1 | 4/2011 | Floyd et al. | |

2014/0249779 A1  9/2014 Cheung et al.

OTHER PUBLICATIONS

Nader, 787 Training for Pilots and Mechanics, Aeromagazine Quarterly, QTR_01, 2008, p. 6-15.*
Haber, 787 Maintenance Training, Boeing, Sep. 21, 2006, p. 1-30.*
Brown, Driving Digital Manufacturing to Reality, Proceedings of the 2000 Winter Simulation Conference, 2000, p. 224-28.*
Brown and Caddick, The Factory is Virual . . . The Savings are Real, RTO AVT Symposium on "Reduction of Military Vehicle Acquisition Time and Cost through Advanced Modelling and Virtual Simulation", Paris, France, Apr. 22-25, 2002, p. 6-1 to 6-8.*
Asia Pacific, Japan Airlines: To Enter Innovative Maintenance Deal with Boeing Troubledd Company Reporter, Oct. 2005.*
AviationWeek, "Carribean Airlines selected Modules", Apr. 1, 2007.*
3rd Dimension, Veritas et Visus, Mar. 2006, vol. 1, No. 8.*
Cortona 3D, Cortona3D RapidTag Powers Boeing's New Maintenance Performance Toolbox, Mar. 14, 2006.*
Extended EPO Search Report for related application 15189236.1 dated May 4, 2016, 7 pp.

* cited by examiner

METHOD AND SYSTEM FOR MANAGING A PROGRAM RELATING TO A PRODUCT

TECHNICAL FIELD

The present disclosure is directed to programs relating to products, and especially to maintenance programs relating to aircraft.

BACKGROUND

Maintenance programs intended to maintain products in good operating condition may sometimes become complex and burdensome. By way of example and not by way of limitation, operating airplanes in North America, Europe, Japan, Australia and in other regulatory jurisdictions which may have a bilateral agreement with the FAA (U.S. Federal Aviation Administration), airlines may need to manage a significant amount of complex and overlapping maintenance requirements set out by the FAA. Compliance with FAA and other requirements by an airline may be required to qualify an airplane for continued airworthiness.

To successfully manage such a maintenance program, structural and maintenance specialists at an airline may need to have a comprehensive and detailed understanding of all the requirements of the maintenance program and of the 3D (three-dimensional) physical locations on an aircraft where the requirements may apply. Maintenance requirements may originate from several sources such as, by way of example and not by way of limitation: OEMs (Original Equipment Manufacturer—e.g. an airplane manufacturer) may provide data or requirements in a MPD (Maintenance Planning Document), in Service Bulletins (SB), in Structural Repair Manuals (SRM), in Service Letters (SL) or Supplemental Structural Inspection Documents (SSID), or in more than one of the foregoing list. Maintenance requirements may also originate from model-specific and general FAA requirements (e.g. Airworthiness Directives (AD) and other special FAA rules); from airline defined maintenance plans and tasks, maintenance documents, policies and procedures; from structural repairs and alterations (both Master Change (MC) Service bulletins and Supplemental Type Certificates (STC)) engineered by either an airplane manufacturer or by third party providers to airplane manufacturers.

Compressed implementation schedules or other imperatives may add to the workload of airline structural and maintenance specialists, which may drive a need for a capability to dynamically adjust time of performance of aircraft maintenance tasks in order to effect timely implementation of all the details of these new and complex FAA or other requirements.

It would be useful to have a method and system for managing a program relating to a product that may provide a global view of the exact 3D physical locations on the airplane where all maintenance requirements or tasks apply.

It would be useful to have a method and system for managing a program relating to a product that may provide a global view of the precise schedule for timely implementation of maintenance requirements or tasks. Having such a global view of tasks and timeliness may be critical to the success of a maintenance program and having a capability to dynamically adjust performance of the program to comply with all FAA and other maintenance requirements.

SUMMARY

A method for managing a program relating to a product, the program including a plurality of program requirements for performing a plurality of program tasks, includes: (a) establishing a location reference system for a representation of the product in three dimensions; (b) identifying a plurality of task-loci in a display; the display presenting the representation of the product according to the location reference system; each respective task-locus of the plurality of task-loci being associated with a respective program task of the plurality of program tasks; (c) characterizing each respective task-locus associated with an accomplished respective program task as a respective completed task-locus; and (d) accounting for accomplishment of the respective program tasks by accounting for the respective completed task-loci.

A system for managing a program relating to a product, the program including a plurality of program requirements for performing a plurality of program tasks, includes: (a) a display unit presenting a plurality of task-loci in association with a representation of the product according to a location reference arrangement in three dimensions; each respective task-locus of the plurality of task-loci being associated with a respective program task of the plurality of program tasks; (b) a control apparatus coupled with the display apparatus and cooperating with the display apparatus to characterize each respective task-locus associated with an accomplished respective program task as a respective completed task-locus; and (c) a data reporting unit coupled with at least one of the control unit and the display unit; the data reporting unit accounting for accomplishment of the respective program tasks by accounting for the respective completed task-loci.

It is, therefore, a feature of the present disclosure to provide a method and system for managing a program relating to a product that may provide a global view of the exact 3D physical locations on the airplane where all maintenance requirements or tasks apply.

It is also a feature of the present disclosure to provide a method and system for managing a program relating to a product that may provide a global view of the precise schedule for timely implementation of maintenance requirements or tasks.

Further features of the present disclosure will be apparent from the following specification and claims when considered in connection with the accompanying drawings, in which like elements are labeled using like reference numerals in the various figures, illustrating the preferred embodiments of the disclosure.

DETAILED DESCRIPTION

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements co-operate or interact with each other (e.g. as in a cause and effect relationship).

The term "locus" is intended herein to indicate a place, location, locality, locale, point, position, site, spot, volume, juncture, junction or other identifiable location-related zone in one or more dimensions. A locus in a physical apparatus may include, by way of example and not by way of limitation, a corner, intersection, curve, line, area, plane, volume or a portion of any of those features. A locus in an electrical apparatus may include, by way of example and not by way of limitation, a terminal, wire, circuit, circuit trace, circuit board, wiring board, pin, connector, component, collection of components, sub-component or other identifiable location-related area in one or more dimensions. A locus in a flow chart may include, by way of example and not by way of limitation, a juncture, step, site, function, query, response or other aspect, step, increment or an interstice between junctures, steps, sites, functions, queries, responses or other aspects of the flow or method represented by the chart.

The present disclosure may be employed in connection with any ongoing program relating to a product in which tasks associated with practicing the program may be performed according to a time schedule. The present disclosure substantially focuses on a maintenance program for aircraft as an exemplary embodiment of the disclosure.

Figure 1:
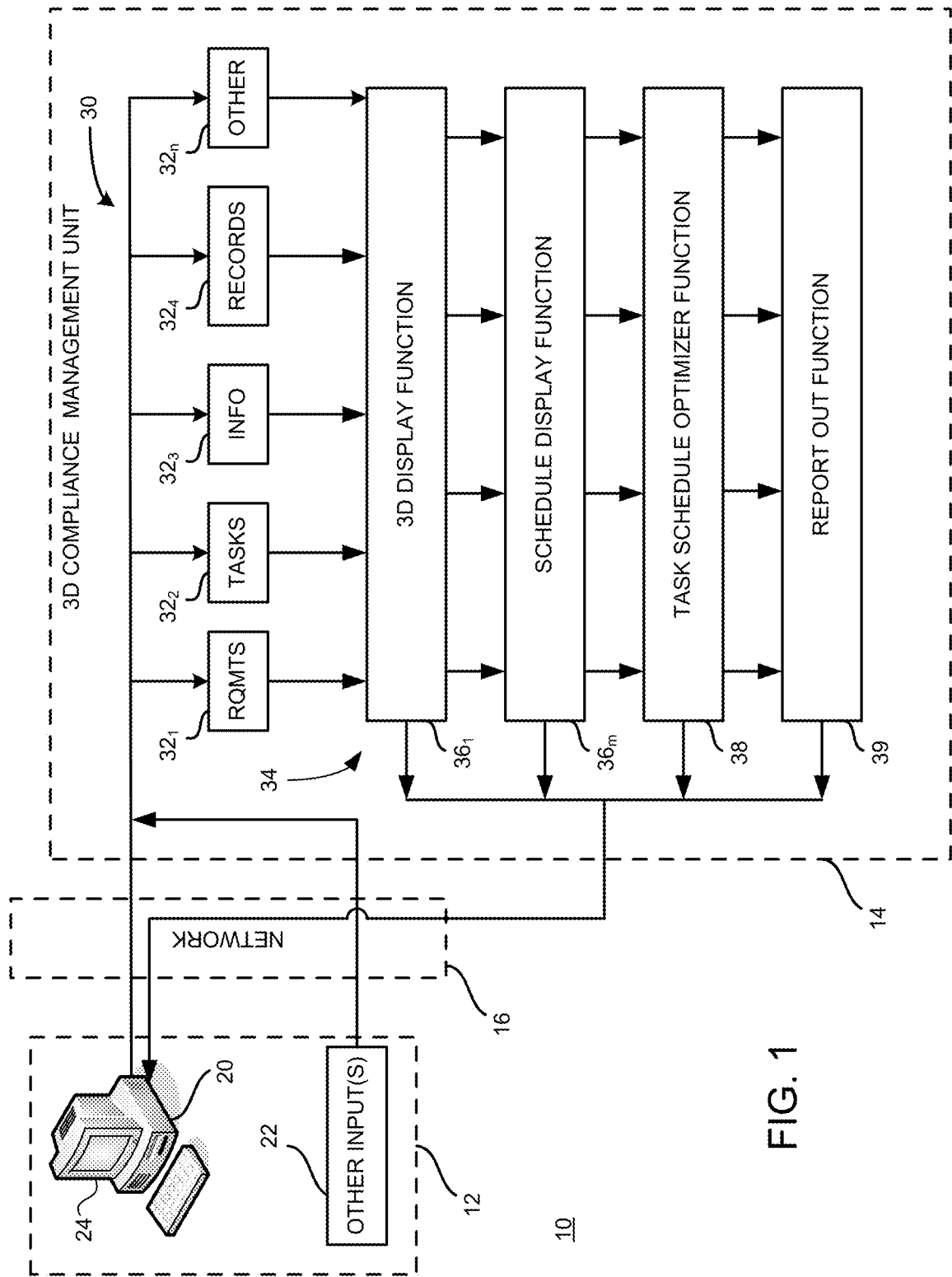
FIG. 1 illustrates a functional depiction of the present disclosure.

FIG. 1 illustrates a functional depiction of the present disclosure. In FIG. 1, a system 10 includes a control apparatus 12 and a 3D compliance management unit 14 communicatingly coupled by a network 16.

Control apparatus 12 may include a computer work station input unit 20 and other inputs 22. Input unit 20 may include a display unit 24. Network 16 may be embodied, by way of example and not by way of limitation, in the Internet or another communication network.

3D compliance management unit 14 may be implemented by or embodied in a computer. 3D compliance management unit 14 may include data functional blocks 30 coupled with control apparatus 12. Data functional blocks 30 may include a requirements data functional block $32_1$, a tasks data functional block $32_2$, an information data functional block $32_3$, a records data functional block $32_4$ and other data functional blocks $32_n$. The indicator "n" is employed to signify that there can be any number of data functional blocks in 3D compliance management unit 14. The inclusion of five data functional blocks $32_k$, $32_2$, $32_3$, $32_4$, $32_n$ in FIG. 1 is illustrative only and does not constitute any limitation regarding the number of data functional blocks that may be included in the 3D compliance management unit of the present disclosure. Throughout this description, use of a reference numeral using a generic subscript herein may be taken to mean that any respective member of the plurality of elements having the same reference numeral may be regarded as included in the description. Thus, by way of example and not by way of limitation, referring to data functional block $32_n$ in describing FIG. 1 may be taken to mean that any data functional block—$32_k$, $32_2$, $32_3$, $32_4$ or $32_n$ (FIG. 1)—may be regarded as capable of employment as described.

Requirements data functional block $32_1$ may operate to receive from control apparatus 12 requirements associated with a program to be implemented. Tasks data functional block $32_2$ may operate to receive from control apparatus 12 tasks associated with meeting the requirements received by requirements data functional block $32_1$. Information data functional block $33_3$ may operate to receive from control apparatus 12 information relating to data received by other data functional blocks $32_n$. Records data functional block $32_4$ may operate to receive from control apparatus 12 information relating to records required to support the program being implemented.

3D compliance management unit 14 may further include a display drive unit 34 coupled with control apparatus 12 via data functional blocks 30. Display drive unit 34 may be embodied in a 3D display drive functional block $36_1$ and a schedule display drive functional block $36_m$. The indicator "m" is employed to signify that there can be any number of display drive functional blocks in 3D compliance management unit 14. The inclusion of two display drive functional blocks $36_1$, $36_m$, in FIG. 1 is illustrative only and does not constitute any limitation regarding the number of display drive functional blocks that may be included in the 3D compliance management unit of the present disclosure.

3D display drive functional block $36_1$ may operate to drive a display unit (e.g., display unit 24) to present a three-dimensional graphic representation of information useful in effecting the program being implemented. Schedule display drive functional block $36_m$ may operate to drive a display unit (e.g., display unit 24) to present a graphic representation of time and schedule information useful in effecting the program being implemented. 3D display drive functional block $36_1$ and schedule display drive functional block $36_m$ may cooperate to present graphic representations on a common display unit (e.g., display unit 24).

3D compliance management unit 14 may further include a task schedule optimizer functional block 38 coupled with control apparatus 12 via data functional blocks 30. Task schedule optimizer functional block 38 may operate to efficiently carry out scheduled events associated with effecting the program being implemented.

3D compliance management unit 14 may further include a report out functional block 39 coupled with control apparatus 12 via data functional blocks 30. Report out functional block 39 may operate as a data reporting unit to present reports associated with effecting the program being implemented.

Display drive unit 34, task schedule optimizer functional block 38 and report out functional block 39 may be coupled with input unit 20 to provide information for display and reports for otherwise presenting to an operator (not shown in FIG. 1).

Figure 2:
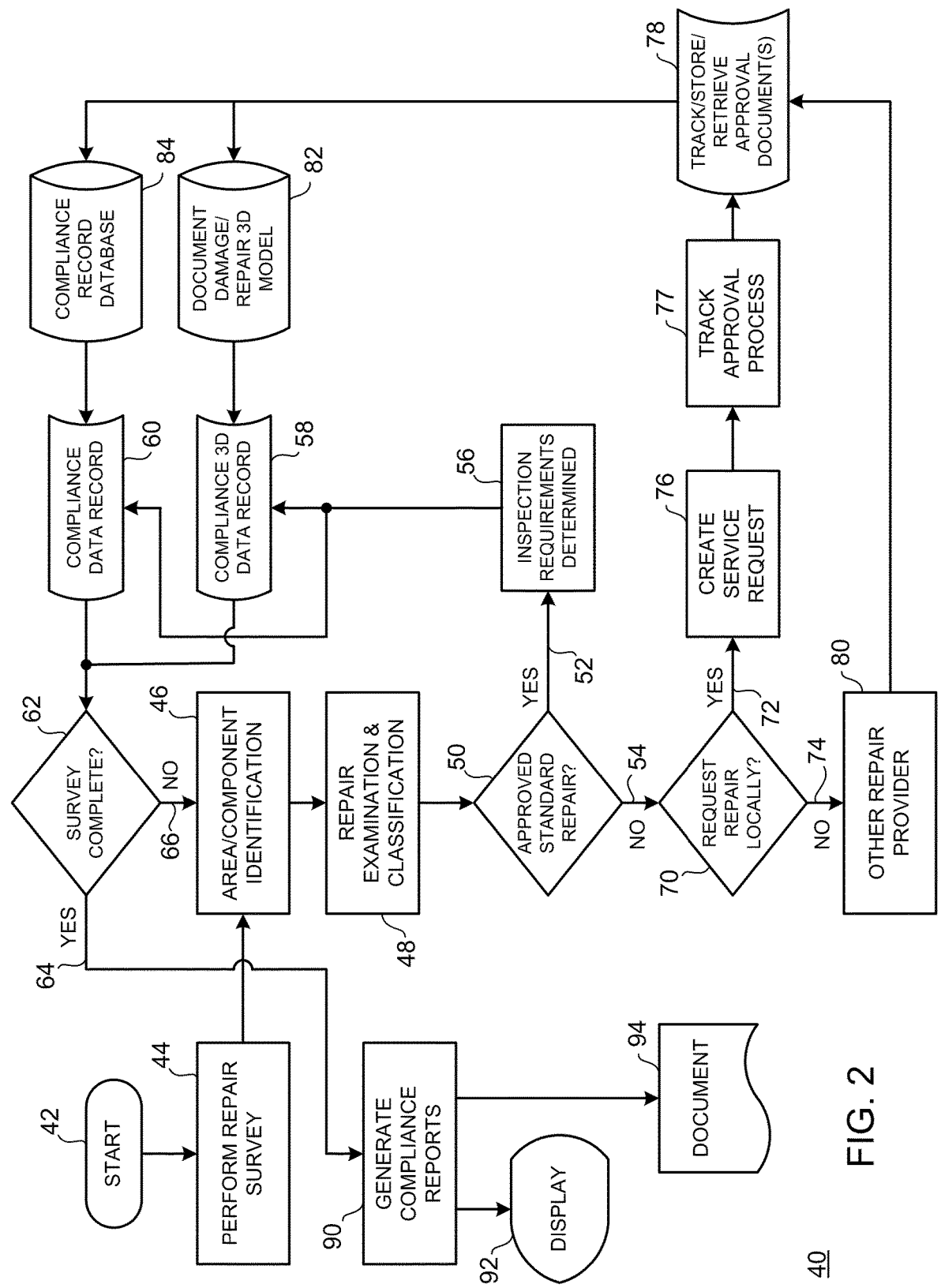
FIG. 2 illustrates an exemplary embodiment of the functional depiction illustrated in FIG. 1.

FIG. 2 illustrates an exemplary embodiment of the functional depiction illustrated in FIG. 1. In FIG. 2, a system 10 (FIG. 1) may be exercised in a representative treatment 40 beginning at a START locus 42. Treatment 40 may continue with identifying the action to follow as performing a repair survey, as indicated by a block 44. A capability to carry out a repair survey may enable tracking of documentation of complete repair and inspection history by individual aircraft. A capability to carry out a repair survey may also facilitate leased equipment and fleet equipment transfers. Based on individual aircraft records, age, survey area and model, treatment 40 may generate an identification and inspection record survey for a particular aircraft or a fleet of aircraft.

Treatment 40 may continue with identifying an area or component at which to perform a repair survey, as indicated by a block 46. This capability for identifying an area or component at which to perform a repair may permit input of damage and inspection analysis by volume, time, task and capacity. This capability for identifying an area or component at which to perform a repair may also permit association of a 3D position or locus on an aircraft with an FAA requirement for repair or inspection and locating all airworthiness directives and service bulletins by 3D location on the aircraft. This capability for identifying an area or component at which to perform a repair may also permit an airline to recognize the 3D proximity of tasks (e.g., repairs, alterations, inspections, cleaning, corrosion protection, removals or replacements and other tasks) and requirements within a user-defined (via input unit 20; FIG. 1) range of time to effect efficient performance of tasks situated within a proximity of each other in locus or in time. This capability for identifying an area or component at which to perform a repair may also provide a single source at which to view all requirements (e.g., FAA, Other Equipment Manufacturers (OEM), airline, third party providers and other generators of program requirements) indicated with appropriate 3D location within a user-defined time interval (via input unit 20; FIG. 1).

Treatment 40 may continue with examining and classifying the repair found at the area or component identified pursuant to block 46, as indicated by a block 48. This capability for examining and classifying a repair may permit using electronic repair assessment guides to provide categorization guidance for all previous repairs. This capability for examining and classifying a repair may also permit matching repair re-use using similarity analysis of previous repair data, and may enable the re-use of damage tolerance data based on 3D location data with respect to an individual aircraft, model of aircraft or class of aircraft. This capability for examining and classifying a repair may also permit performing a search of previous repairs and matching capability based on location, size, material, type, model, or other analysis and may extract previous approved repairs in the repair database through inferred data analysis. This capability for examining and classifying a repair may also permit locating repairs by location and part number integration with previous approved repairs in a repair database.

Treatment 40 may continue by posing a query whether the repair was an approved standard repair (e.g., a repair approved by the FAA), as indicated by a query block 50. If the repair was an approved standard repair, treatment 40 may proceed from query block 50 via a YES response line 52 and inspection requirements for the repair may be determined, as indicated by a block 56. This capability for determining inspection requirements may permit integrating inspection task requirements with maintenance task card modification and planning. This capability for determining inspection requirements may permit scheduling, tracking and managing all maintenance actions required by various entities, including incorporating both repetitive and non-repetitive inspections. This capability for determining inspection requirements may permit grouping and scheduling of tasks managed by 3D volume location associated with specific maintenance zones of activities based on an individual airplane's availability for scheduled periods for performing maintenance.

Treatment 40 may continue with creating and storing a compliance 3D data record at a data store 58 and creating and storing a compliance data record at a data store 60.

If the repair was not an approved standard repair, treatment 40 may proceed from query block 50 via a NO response line 55 to pose a query whether the repair is a locally requested repair (e.g., requested by an airplane manufacturer), as indicated by a query block 70.

If the repair is a locally requested repair, treatment 40 may proceed from query block 70 via a YES response line 72 to create a service request, as indicated by a block 76. Treatment 40 may continue with tracking a predetermined approval process associated with a creation of a service request, as indicated by a block 77. Treatment 40 may continue with tracking, storing or retrieving approval documents associated with the service request as appropriate, as indicated by a block 78.

If the repair is not a locally requested repair, treatment 40 may proceed from query block 70 via a NO response line 74 to obtain information regarding the repair as originating from another repair provider (e.g., another FAA repair provider), as indicated by a block 80. Treatment 40 may continue with tracking, storing or retrieving approval documents associated with the service provided by another repair provider as appropriate, as indicated by a block 78.

Treatment 40 may proceed from block 78 with creating an entry to document damage or repair in a 3D model, as indicated by symbol 82, and may store a data record indicating that entry at data store 58. Treatment 40 may also proceed from block 78 to create an entry to document compliance with a repair requirement, as indicated by symbol 84 and may store a data record indicating that compliance at a data store 60.

Treatment 40 may proceed from data stores 58, 60 by providing records from data stores 58, 60 to pose a query whether the currently extant survey (identified in block 44) is complete, as indicated by a query block 62. If the currently extant survey is not complete, treatment 40 may proceed from query block 62 via a NO response line 66 and treatment 40 may proceed thereafter as described above in connection with blocks 46, 48, 50, 56, 58, 60, 70, 76, 77, 78, 80, 82, 84, 62.

If the currently extant survey is complete, treatment 40 may proceed from query block 62 via a YES response line 64 to generate compliance reports, as indicated by a block 90. This capability to generate reports may also include a capability to perform information analysis. This report generation and information analysis function may support the FAA compliance audit process by providing proof of all modification and repairs shown in 3D and retrieving all authorizations for modifications and repairs. The reports may also visualize and track inspections and replacement of temporary repairs. Such a capability may permit an airline to demonstrate that each airplane is compliant with all FAA data requirements. In addition, the report generation and information analysis function may manage transfer of a complete repair and inspection history of an airplane transfer of equipment documentation, thus enabling return to leaser and fleet equipment transfer through the generation of a transfer inspection report and mini-survey. the report generation and information analysis function may provide standard data exchange for structural repair records and inspections.

Compliance reports may be generated in any of several formats. By way of illustration and not by way of limitation, reports may be presented via a display, as indicated by a display symbol 92, and a document, as indicated by a document symbol 94.

Figure 3:
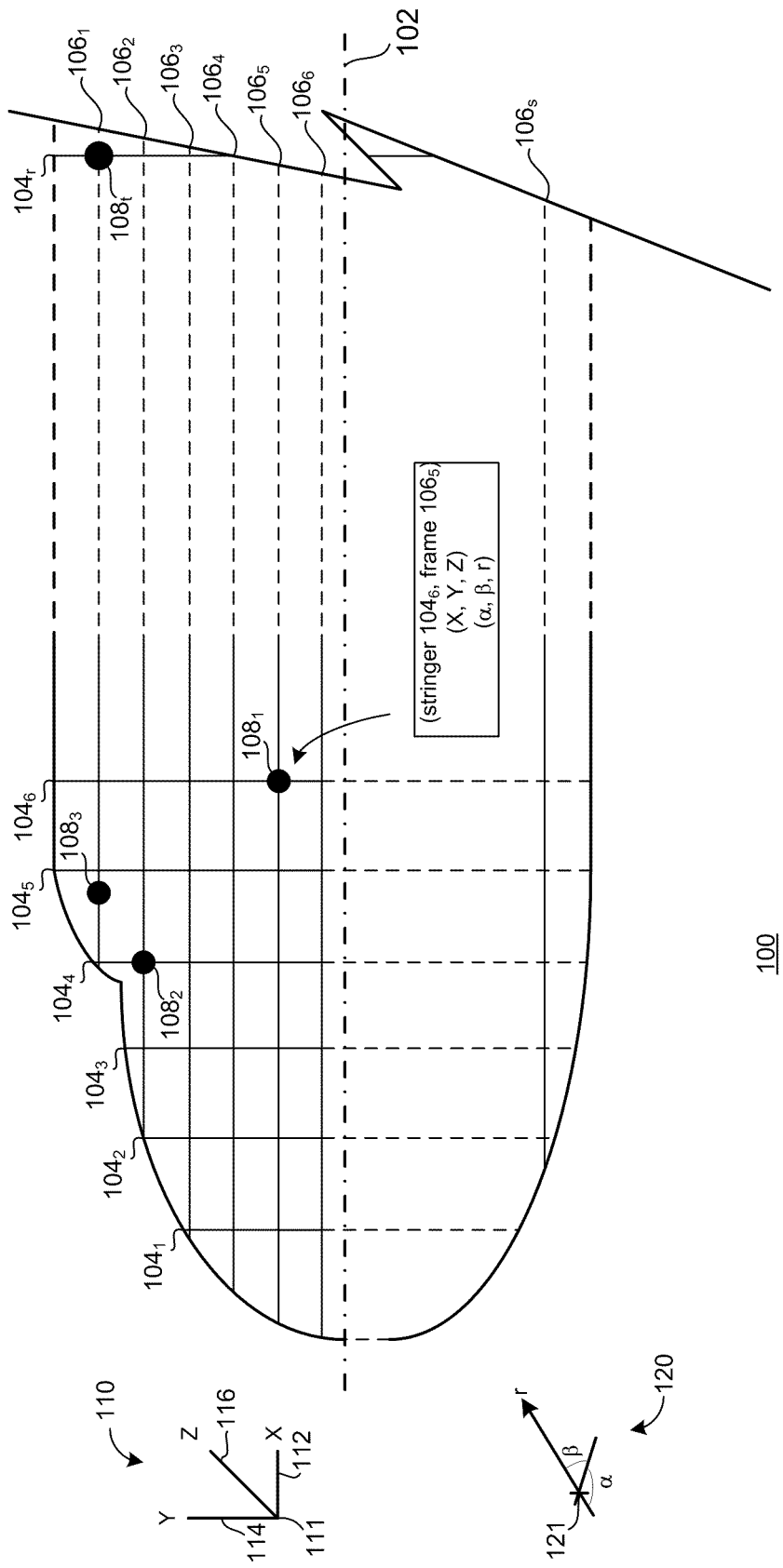
FIG. 3 illustrates a representative aircraft in connection with various location reference systems indicating exemplary task-loci in the aircraft.

FIG. 3 illustrates a representative aircraft in connection with various location reference systems indicating exemplary task-loci in the aircraft. In FIG. 3, a schematic representation of an aircraft 100 is illustrated having stringers $104_1$, $104_2$, $104_3$, $104_4$, $104_5$, $104_6$, $104_r$ generally perpendicular with an axis 102. The indicator "r" is employed to signify that there can be any number of stringers in aircraft 100. The inclusion of seven stringers $104_1$, $104_2$, $104_3$, $104_4$, $104_5$, $104_6$, $104_r$ in FIG. 3 is illustrative only and does not constitute any limitation regarding the number of stringers that may be included in an aircraft employed with the present disclosure.

Aircraft 100 may also have frames $106_1$, $106_2$, $106_3$, $106_4$, $106_5$, $106_6$, $106_s$ generally parallel with axis 102. The indicator "s" is employed to signify that there can be any number of frames in aircraft 100. The inclusion of seven frames $106_1$, $106_2$, $106_3$, $106_4$, $106_5$, $106_6$, $106_s$ in FIG. 3 is illustrative only and does not constitute any limitation regarding the number of frames that may be included in an aircraft employed with the present disclosure.

Aircraft 100 is illustrated in FIG. 3 in two dimensions. However, one skilled in the art of airplane design may understand that stringers $104_r$ and frames $106_s$ may be arranged in three dimensions (3D) and it is in such a 3D context that this description of FIG. 3 is most pertinent.

Representative task-loci $108_1$, $108_2$, $108_3$, $108_t$ are illustrated in FIG. 3. The indicator "t" is employed to signify that there can be any number of task-loci identified in aircraft 100. The inclusion of four task-loci $108_1$, $108_2$, $108_3$, $108_t$ in FIG. 3 is illustrative only and does not constitute any limitation regarding the number of task-loci that may be identified in an aircraft employed with the present disclosure. Each respective task-locus $108_t$ is associated with a respective program task, such as a maintenance task. Locations of task-loci $108_t$ within or on aircraft 100 may be described or fixed according to any convenient reference system. By way of example and not by way of limitation, task-loci may be located according to stringer-frame relations. In such a locating arrangement, by way of example and not by way of limitation, task-locus $108_1$ may be described as being located at (stringer $104_6$, frame $106_5$).

By way of further example and not by way of limitation, a reference frame 110 may be established having an origin 111 and three axes: X-axis 112, Y-axis, 114 and Z-axis 116. Axes 112, 114, 116 are substantially orthogonal and intersect substantially at axis 111. Task-locus $108_1$ may be located substantially at a point defined by measurements along axes 112, 114, 116: $(X_1, Y_1, Z_1)$.

Alternatively, by way of further example and not by way of limitation, a reference frame 120 may be established having an origin 121 and three polar coordinates: an angle α measured in a first plane, an angle β measured in a second plane substantially perpendicular with the first plane and a radius R (distance from origin 121). Task $108_1$ may be located substantially at a point defined by coordinates (α, β, r).

Figure 4:
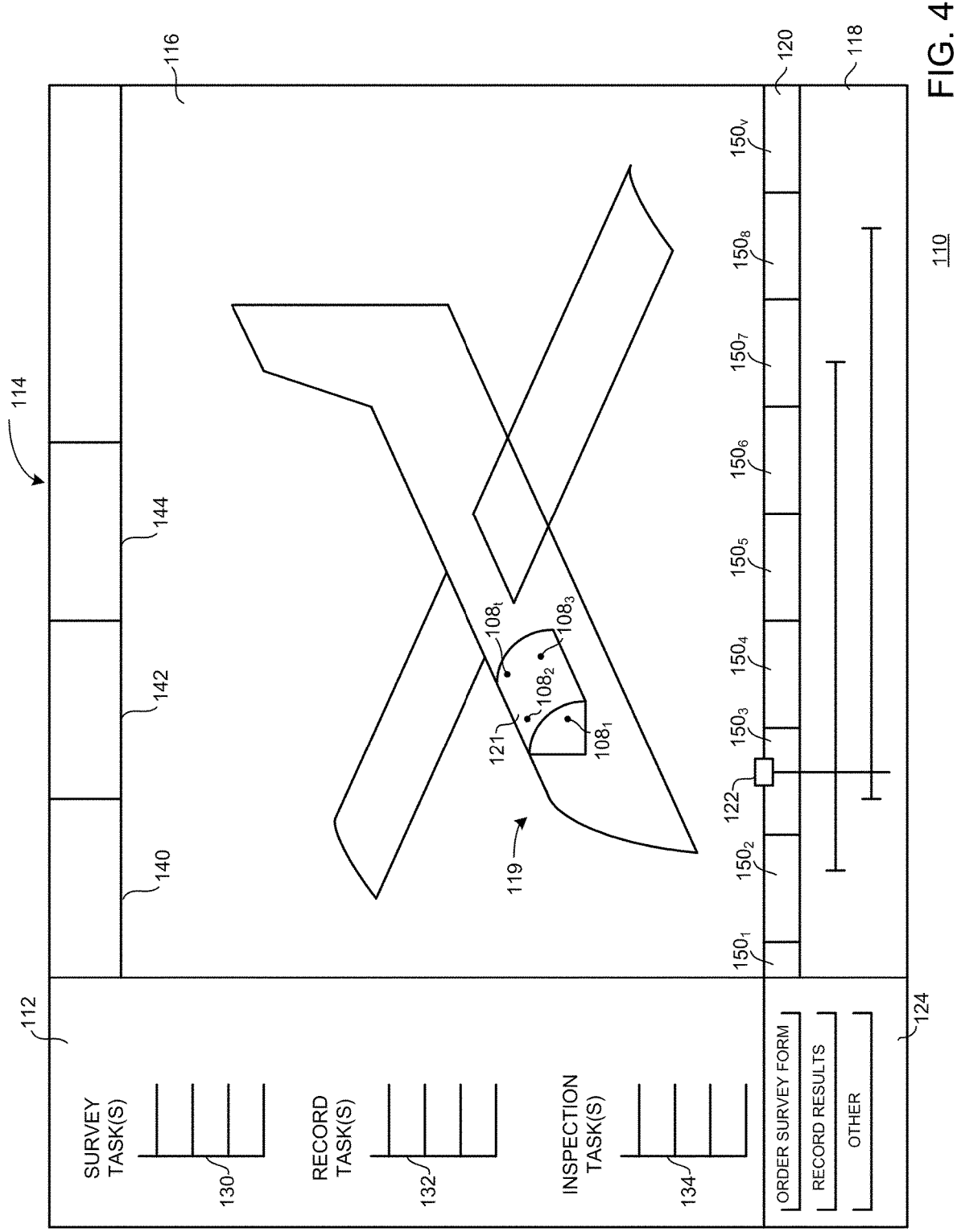
FIG. 4 illustrates an exemplary display appropriate for use with the present disclosure.

FIG. 4 illustrates an exemplary display appropriate for use with the present disclosure. In FIG. 4, a display window 110 may include a task window 112, a view selection window 114, a selected view window 116, a schedule window, a date indicator window 120, a time indicator 122 and an action window 124.

Task window 112 may permit a user to call up particular tasks associated with a program, such as a maintenance program. By way of example and not by way of limitation tasks may be identified as survey tasks, record tasks or inspection tasks. Survey tasks may be associated with determining status of completion of particular tasks, tasks to be completed within a particular time frame or another group of tasks. Survey tasks may be indicated or selected in a survey task section 130 of task window 112.

Record tasks may be associated with reporting requirements levied by various authorities such as, by way of example and not by way of limitation, the FAA. Record tasks may be indicated or selected in a record task section 132 of task window 112.

Inspection tasks may be associated with requirements to conduct inspections according to a periodic schedule or on an as occurring basis as may be set out by various authorities. Inspection tasks may be indicated or selected in an inspection tasks section 134 of task window 112.

View selection window 114 may permit a user to select a particular view of a particular section of a particular airplane or airplane-type. By way of example and not by way of limitation, a section 140 of view selection window 114 may permit selection of a particular airplane, a section 142 may permit selection of a particular body section 119 of the airplane selected in section 140 and a section 144 may permit selection of a particular zone 121 of the body section selected in section 142.

Selected view window 116 presents the particular view selected in view selection window 114.

Schedule window 118 indicates schedule requirements of a program as mapped onto the time frame indicated by date indicator window 120.

Date indicator window 120 may be divided into months, weeks, days, hours or another time interval arranged among segments $150_1$, $150_2$, $150_3$, $150_4$, $150_5$, $150_6$, $150_7$, $150_8$, $150_v$. The indicator "v" is employed to signify that there can be any number of segments in date indicator window 120. The inclusion of nine segments $150_1$, $150_2$, $150_3$, $150_4$, $150_5$, $150_6$, $150_7$, $150_8$, $150_v$ in FIG. 4 is illustrative only and does not constitute any limitation regarding the number of segments that may be included in a display window employed with the present disclosure.

Time indicator 122 may be oriented to indicate a subdivision of a segment $150_v$.

Action window 124 may provide input loci for a user to indicate certain actions such as, by way of example and not by way of limitation, ordering generation of a survey form, ordering recording of repair survey results for display in selected view window 116 or performing another task associated with a program.

Task-loci $108_1$, $108_2$, $108_3$, $108_t$ (see also FIG. 3) may be indicated in selected view window 116.

The system of the present disclosure may be configured to permit:

Integrated and comprehensive management of compliance with FAA aircraft maintenance requirements.

Allowing a user to perform maintenance research in a "3D fly-through" mode to see where each task and requirement is located on an airplane and the associated time-line requirements.

Allowing a user to author new tasks and requirements with a 3D locater linked with each task and requirement.

Providing a single source application to view all requirements originating from various authorities with their respective 3D locations within a user-defined time interval.

Allowing a user to document and show all maintenance, inspections, repairs and alterations performed with 3D links and within a user-defined time interval.

Allowing a user to easily recognize the 3D proximity of tasks (e.g., repairs, alterations, inspections, cleaning, corrosion protection, removals, replacements and other tasks) and requirements within a user defined time interval, for the purpose of efficiently and conveniently grouping and scheduling tasks during scheduled downtime when specific areas (zones) of an airplane will be "opened up" and most available for scheduled periods of time for maintenance.

Enabling physical and records audits of an airplane for all repairs and alterations by clearly showing an auditor the 3D location of each maintenance/repair/alteration record and also for audit of records during transfer of airplanes between airlines and lease companies.

3D cataloging and retrieval of modification data for an aircraft modification business.

Comprehensive 3D configuration management of the as-flying configuration of an aircraft: structure, repairs, alterations, systems and loadable software.

Figure 5:
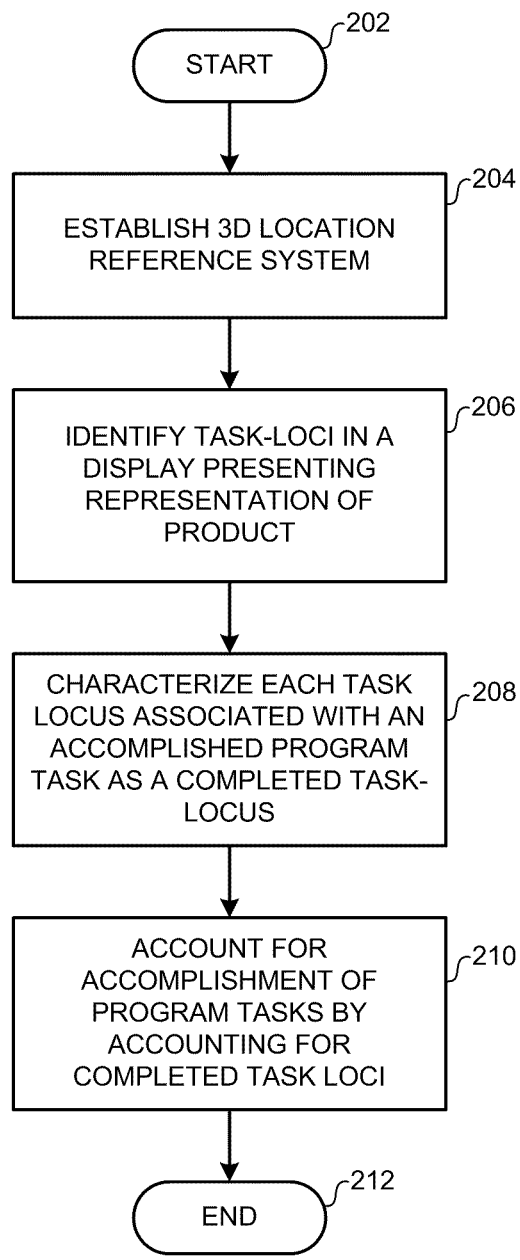
FIG. 5 is a flow chart illustrating the method of the present disclosure.

FIG. 5 is a flow chart illustrating the method of the present disclosure. In FIG. 5, a method 200 for managing a program relating to a product begins at a START locus 202. Method 200 may be implemented by or embodied in a computer. The program includes a plurality of program requirements for performing a plurality of program tasks.

Method 200 continues with establishing a location reference system for a representation of the product in three dimensions, as indicated by a block 204.

Method 200 continues with identifying a plurality of task-loci in a display, as indicated by a block 206. The display presents the representation of the product according to the location reference system. Each respective task-locus of the plurality of task-loci is associated with a respective program task of the plurality of program tasks.

Method 200 continues with characterizing each respective task-locus associated with an accomplished respective program task as a respective completed task-locus, as indicated by a block 208.

Method 200 continues with accounting for accomplishment of the respective program tasks by accounting for the respective completed task-loci, as indicated by a block 210. Method 200 terminates at an END locus 212.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

We claim:

1. A method for managing a maintenance program relating to an aircraft, said program including a plurality of maintenance tasks to be performed with respect to a physical location in at least one aircraft, said method performed by a compliance management computer comprising at least one processor in communication with at least one memory device, said method comprising:
    (a) storing, in a database, a plurality of maintenance requirements and a plurality of maintenance actions for the at least one aircraft, wherein each of the plurality of maintenance requirements and the plurality of maintenance actions are associated with a physical location on the at least one aircraft;
    (b) establishing, by the compliance management computer, a three dimensional representation of physical locations in the at least one aircraft;
    (c) querying the database to identify a plurality of maintenance task-loci associated with respective maintenance tasks in the three dimensional representation;
    (d) instructing, by the compliance management computer, a display device to display a time line selection tool and the three dimensional representation;
    (e) receiving, by the compliance management computer, a selection of a time interval from a plurality of time intervals displayed in a time line through the time line selection tool, wherein the selection is made using a time indicator;
    (f) filtering, by the compliance management computer, the plurality of tasks to identify a first subset of tasks that must be performed within the selected time interval;
    (g) filtering the first subset of tasks based on a proximity to a location to generate a second subset of tasks; and
    (h) using a three dimensional display drive included in the compliance management computer, instructing the display device to display the three dimensional representation of the at least one aircraft, and at least one visual indicator representing each of the second subset of identified tasks, wherein each visual indicator is overlaid on the three dimensional representation at a specific physical location where the respective task is to be performed.

2. The method for managing a program as recited in claim 1 wherein establishing the three dimensional representation further comprises establishing the three dimensional representation utilizing three substantially orthogonal axes having a substantially common origin.

3. The method for managing a program as recited in claim 1 wherein establishing the three dimensional representation further comprises establishing the three dimensional representation utilizing a three dimensional polar coordinate system substantially centered at a common origin.

4. The method for managing a program as recited in claim 1 further comprising performing a similarity analysis for repair data associated with at least one component of the at least one aircraft.

5. The method for managing a program as recited in claim 1 wherein establishing the three dimensional representation further comprises establishing the three dimensional representation of at least a portion of a fuselage of the at least one aircraft, said fuselage including a plurality of frames and a plurality of stringers, each respective stringer of said plurality of stringers being generally perpendicular with at least one respective frame of said plurality of frames.

6. The method for managing a program as recited in claim 1 further comprising performing a search of a repair database for at least one previous repair associated with at least one component of the at least one aircraft.

7. The method for managing a program as recited in claim 1 further comprising receiving, by the compliance management computer, information relating to a damage and inspection analysis in association with a volume.

8. The method for managing a program as recited in claim 1 wherein displaying the at least one visual indicator further comprises displaying a plurality of visual indicators that are situated within a predefined proximity of each other.

9. The method for managing a program as recited in claim 1 further comprising:
    scheduling program tasks to perform for a given physical location in the at least one aircraft within the selected time interval.

10. The method for managing a program as recited in claim 1 further comprising:
    receiving a selection of a particular zone within the at least one aircraft; and
    displaying the at least one visual indicator further comprises displaying the at least one visual indicator associated with the particular zone within the at least one aircraft.

11. The method for managing a program as recited in claim 1 further comprising:
displaying an action window; and
receiving, using the action window, an indication of an action to be performed in association with the program.

12. The method for managing a program as recited in claim 11 wherein receiving an indication of an action to be performed further comprises receiving an indication of an action to order generation of a survey form.

13. The method for managing a program as recited in claim 1 wherein displaying the at least one visual indicator further comprises displaying at least one visual indicator associated with at least one of a survey task, a record task, and an inspection task.

14. The method for managing a program as recited in claim 1 further comprising displaying a schedule window indicating schedule requirements of the program mapped onto the selected time interval.

15. The method for managing a program as recited in claim 1 further comprising generating an inspection record survey for the at least one aircraft.

16. A system for managing a maintenance program relating to an aircraft, said maintenance program including a plurality of tasks to be performed with respect to a physical location in at least one aircraft, the system comprising a compliance management computer including a three dimensional display drive, said compliance management computer including at least one processor in communication with at least one memory device, said compliance management computer configured to:
(a) store, in a database, a plurality of maintenance requirements and a plurality of maintenance actions for the at least one aircraft, wherein each of the plurality of maintenance requirements and the plurality of maintenance actions are associated with a physical location on the at least one aircraft;
(b) establish a three dimensional representation of physical locations in the at least one aircraft;
(c) query the database to identify a plurality of maintenance task-loci associated with respective maintenance tasks in the three dimensional representation;
(d) instruct a display device to display a time line selection tool and the three dimensional representation;
(e) receive a selection of a time interval from a plurality of time intervals displayed in a time line through the time line selection tool, wherein the selection is made using a time indicator;
(f) filter the plurality of tasks to identify a first subset of tasks that must be performed within the selected time interval;
(g) filter the first subset of tasks based on a proximity to a location to generate a second subset of tasks; and
(h) using said three dimensional display drive, instruct the display device to display the three dimensional representation of the at least one aircraft and at least one visual indicator representing each of the second subset of identified tasks, wherein each visual indicator is overlaid on the three dimensional representation at a specific physical location where the respective task is to be performed.

17. The system for managing a program as recited in claim 16, wherein said compliance management computer is further configured to perform a similarity analysis for repair data associated with at least one component of the at least one aircraft.

18. The system for managing a program as recited in claim 16, wherein said compliance management computer is further configured to perform a search of a repair database for at least one previous repair associated with at least one component of the at least one aircraft.

19. The system for managing a program as recited in claim 16, wherein said compliance management computer is further configured to receive information relating to a damage and inspection analysis in association with a volume.

20. The system for managing a program as recited in claim 16, wherein said compliance management computer is further configured such that displaying the at least one visual indicator further comprises displaying a plurality of visual indicators that are situated within a predefined proximity of each other.

* * * * *